United States Patent

Birke et al.

[11] 4,194,879
[45] Mar. 25, 1980

[54] PROCESS FOR THE DYEING OR PRINTING OF POLYESTER FIBERS

[75] Inventors: Walter Birke; Hans-Ulrich von der Eltz; Franz Schön, all of Frankfurt am Main, Fed. Rep. of Germany

[73] Assignee: Hoechst Aktiengesellschaft, Frankfurt am Main, Fed. Rep. of Germany

[21] Appl. No.: 903,008

[22] Filed: May 4, 1978

[30] Foreign Application Priority Data

May 7, 1977 [DE] Fed. Rep. of Germany ....... 2720585

[51] Int. Cl.² ............................ C09B 1/00; D06P 1/20
[52] U.S. Cl. ........................... 8/39 B; 8/39 C; 8/94 A; 8/178 R; 8/179
[58] Field of Search .................. 8/39 C, 94 A, 178 R, 8/179, 39 B

[56] References Cited

U.S. PATENT DOCUMENTS 3,988,109 10/1976 Schuierer ........................... 8/94 R
4,121,899 10/1978 Chambers et al. ................. 8/94 A

FOREIGN PATENT DOCUMENTS 1040501 10/1958 Fed. Rep. of Germany .
2262713 10/1975 France .

OTHER PUBLICATIONS

Venkataraman, K., "The Chemistry of Synthetic Dyes," vol. III, (Academic Press), 1970, pp. 385-386, 389, and 393-395.
Colour Index (Third Edition), 1970, vol. 4, p. 4535; C. I. 60755.
Colour Index (Revised Third Edition), 1975, vol. 6, p. 6402; C. I. 60756.

*Primary Examiner*—A. Lionel Clingman
*Attorney, Agent, or Firm*—Curtis, Morris & Safford

[57] ABSTRACT

In the process for the pad-dyeing or printing of materials consisting of, or containing, polyester or polyamide fibers or filaments, in which process the materials are padded or printed in common manner with aqueous baths or printing pastes of disperse dyestuffs, and the dyestuffs are subsequently fixed by the action of liquid or gaseous methylene chloride or both of the said phases of methylene chloride, the improvement that dyestuffs of the general formula

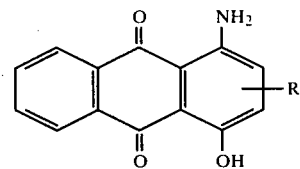

in which R is an alkoxy group of from 1 to 3 carbon atoms, the group

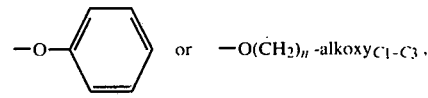

in which n stands for an integer of from 2 to 6, are used.

1 Claim, No Drawings

PROCESS FOR THE DYEING OR PRINTING OF POLYESTER FIBERS

The present invention relates to a process for the dyeing or printing of polyester fibers.

From German Auslegeschrift No. 2,433,662 a process for the dyeing and finishing of textile goods has already been known, according to which a solution or dispersion of a dyestuff or chemical agent appropriate for application is applied onto the textile goods which are subsequently subjected to the action of air enriched with a halogenated hydrocarbon having a temperature of about 30° C. at a maximum, for the purpose of dyestuff fixation. This process comprises applying the dyestuff and/or chemical agent in an aqueous solution or dispersion onto the textile goods and then exposing the latter to an air current which has been enriched with methylene chloride.

From German Patent Specification No. 1,040,501 a process for the dyeing of textile goods of synthetic fibers has been known, according to which the textile goods are passed first through an aqueous solution of the dyestuff and are then heated in order to eliminate water. Subsequently, the textile goods are exposed to the saturated vapor of methylene chloride for the fixation of the dyestuff, in which process the methylene chloride is condensed.

Furthermore, a process for the pad-dyeing or printing of materials consisting of, or containing, polyester or polyamide fibers or filaments has been proposed, in which process aqueous baths and/or printing pastes of disperse dyestuffs are applied in common manner onto the materials, and the dyestuffs are then fixed by a treatment with methylene chloride. This process comprises bringing the padded or printed and optionally dried material into a close contact with an accompanying material containing methylene chloride, or bonding said material on one side with an accompanying material which is then moistened with methylene chloride, and thereafter allowing the material to dwell in either case at a temperature of up to 41° C.

According to another process proposed, in which aqueous baths and/or printing pastes of disperse dyestuffs are also applied in common manner onto materials of polyester or polyamide fibers or filaments, the fixation of the dyestuffs is effected by applying methylene chloride in a liquid form onto the padded or printed and optionally dried material by way of spraying, sprinkling, foaming, padding, or by means of rollers or brushes.

All these known or proposed processes show as common process step the dyestuff fixation in the presence of methylene chloride (or probably by the methylene chloride), wherein the methylene chloride is present in a liquid and/or gaseous phase.

It has now been found that materials which consist of, or contain, polyester or polyamide fibers or filaments can be pad-dyed or printed, in which process the materials are padded and/or printed in common manner with aqueous baths and/or printing pastes of disperse dyestuffs, and subsequently the dyestuffs are fixed by the action of liquid and/or gaseous methylene chloride, by using dyestuffs of the general formula

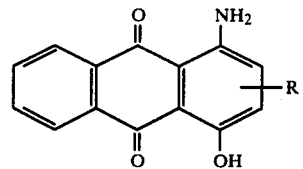

in which R represents an alkoxy group of from 1 to 3 carbon atoms, the group

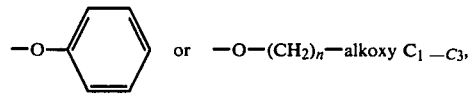

wherein n stands for an integer of from 2 to 6.

For the dyeing processes comprising the dyestuff fixation on polyester fibers in the presence of methylene chloride, the experiences made through processes for the dyeing of polyester of the common kind are not applicable in any manner. Thus, for example, only an insufficient dyestuff yield is obtained in particular with the dyestuffs of the formulae

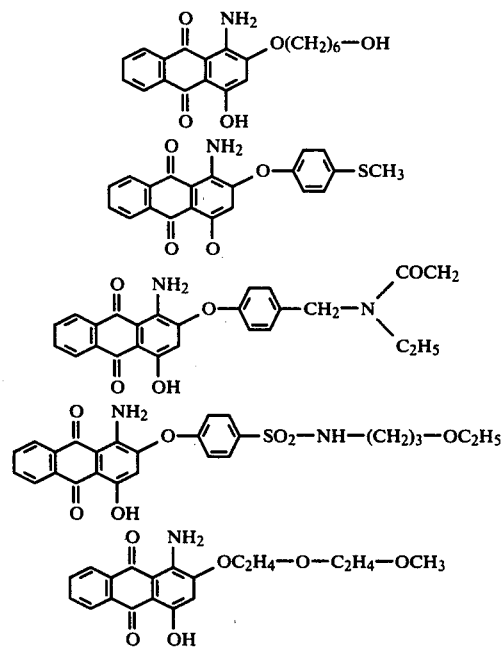

although these dyestuffs lead to very good dyestuff yields according to the conventional methods (i.e. without fixation in the presence of methylene chloride).

Of the dyestuffs according to formula 1, those having the following formulae are particularly suitable:

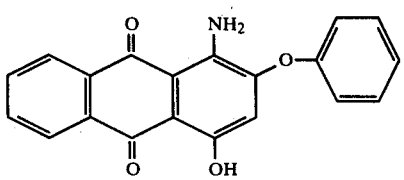

-continued

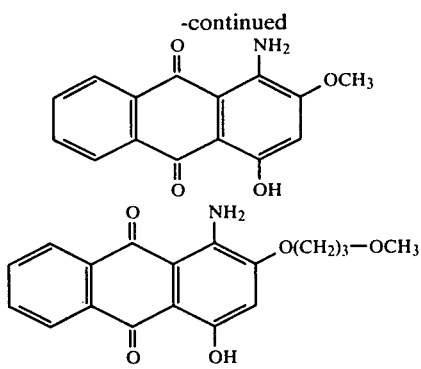

The following Examples serve to illustrate the invention.

EXAMPLE 1

A fabric of texturized polyester fibers is padded on a padder at room temperature with a liquor pick-up of 90% with an aqueous bath which contains per liter 20 g of the dyestuff of the formula

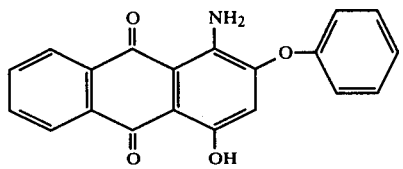

and 1 g of a commercial wetting agent.

Subsequently, the padded wet fabric is passed for 1 minute through a chamber filled with methylene chloride vapor. After the condensation has been completed, the material is wound up. Thereafter the material is allowed to dwell for 3 hours at room temperature in a closed container or in a sheet which is not permeable for methylene chloride and is then subjected to an after-treatment in common manner.

The red dyeing obtained shows the fastness properties which are characteristic of the dyestuff used.

EXAMPLE 2

A fabric of texturized polyester fibers is padded on a padder at room temperature with a liquor pick-up of 90% with an aqueous bath which contains per liter 20 g of the dyestuff of the formula

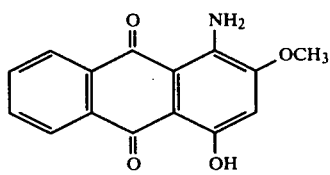

and 1 g of a commercial wetting agent.

At the same time a cotton fabric is padded with methylene chloride. Both fabrics are wound up together. Subsequently, they are allowed to dwell for 3 hours at room temperature.

Following an after-treatment common for polyester fibers, a red dyeing is obtained which shows the fastness properties that are characteristic of the dyestuff used.

EXAMPLE 3

A textile material of texturized polyester filaments is impregnated with an aqueous dyestuff liquor which contains 20 g/l of the dyestuff of the formula

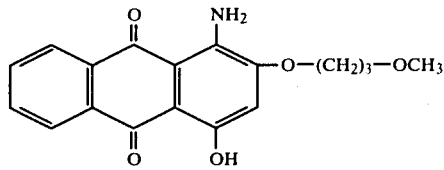

The impregnated material is wound up on a perforated cylinder. Thereafter air enriched with methylene chloride is passed through the material roll. Following a treatment period of 4 hours at room temperature the material is treated with water vapor, and the dyeing is completed as usual by a reductive purification, as well as by rinsing and drying.

A red dyeing is obtained which shows good fastness properties.

EXAMPLE 4

A fabric of polyester staple fibers is printed with a printing paste which contains the following components per kilogram:

20 Grams of the red dyestuff mentioned in Example 1, 906 g of water, 50 g of a sodium alginate, 16 g of a starch ether, 6.7 of a water softening agent on the basis of polyphosphate, and 1.3 g of citric acid.

Subsequently, the printed moist fabric is passed for 1 minute through a chamber filled with methylene chloride vapor. After the condensation has taken place, the material is wound up.

Thereafter the material is allowed to dwell in a closed container or in a sheet which is not permeable for methylene chloride for 3 hours at room temperature and is then subjected to a reductive after-treatment in common manner.

A print is obtained which shows the fastness properties that are characteristic of the dyestuff used.

We claim:

1. In the process for the pad-dyeing or printing of materials consisting of, or containing, polyester or polyamide fibers or filaments, in which process the materials are padded or printed in common manner with aqueous baths or printing pastes of disperse dyestuffs, and the dyestuffs are subsequently fixed by the action of liquid or gaseous methylene chloride or both of the said phases of methylene chloride, the improvement that dyestuffs of the general formula

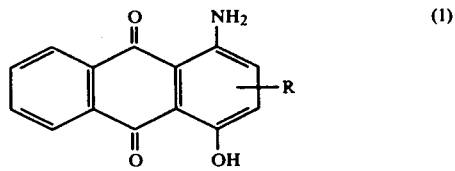 (1)

in which R is an alkoxy group of from 1 to 3 carbon atoms, the group

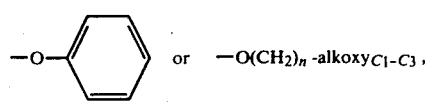

in which n stands for an integer of from 2 to 6, are used.

* * * * *

UNITED STATES PATENT AND TRADEMARK OFFICE
CERTIFICATE OF CORRECTION

PATENT NO. : 4,194,879
DATED : March 25, 1980
INVENTOR(S) : Birke et al.

It is certified that error appears in the above-identified patent and that said Letters Patent are hereby corrected as shown below:

In the Heading, Item [30], "2720585" should be --2720586--.

Signed and Sealed this

Tenth Day of June 1980

[SEAL]

Attest:

Attesting Officer

SIDNEY A. DIAMOND

Commissioner of Patents and Trademarks